(12) United States Patent
Bahrami (10) Patent No.: US 9,296,831 B2
(45) Date of Patent: Mar. 29, 2016

(54) HERBAL EXTRACT COMPOSITION FOR THE TREATMENT OF DIABETES AND A METHOD OF EXTRACTING THE SAME

(71) Applicant: Gholamreza Bahrami, Kermanshah (IR)

(72) Inventor: Gholamreza Bahrami, Kermanshah (IR)

(\*) Notice: Subject to any disclaimer, the term of this patent is extended or adjusted under 35 U.S.C. 154(b) by 11 days.

(21) Appl. No.: 14/164,223

(22) Filed: Jan. 26, 2014

(65) Prior Publication Data

US 2014/0256673 A1  Sep. 11, 2014

(51) Int. Cl.
*C08B 37/00* (2006.01)

(52) U.S. Cl.
CPC ......... *C08B 37/0087* (2013.01); *C08B 37/0045* (2013.01)

(58) Field of Classification Search
None
See application file for complete search history.

(56) References Cited

PUBLICATIONS

Van Laere, J. Agric. Food Chem. 2000, 48, 1644-1652.*

Karasakai, Asian Journal of Chemistry, vol. 25, No. 3 (2013), 1761-1762.*

The Naturephile ,Flowers and foliage, Oct. 10, 2012, http://thenaturephile.com/tag/rosa-arvensis/.*

Jeremy Taylor, Rosehip Syrup Recipe, Oct. 7, 2012, http://www.jeremytaylor.eu/recipes/rosehip-syrup-recipe/.*

* cited by examiner

*Primary Examiner* — Layla Bland
(74) *Attorney, Agent, or Firm* — Barry Choobin; Patent 360 LLC (57) ABSTRACT

The embodiments herein provide a method for isolation and purification of a novel oligosaccharide molecule from the fruits of *Rosa arvensis* for the treatment of diabetes. The fruit is dried, powdered and subjected to deionized water. The deionized water solution is subjected to silica gel column and the filtrate is subjected to ethanol-water mixture. The filtrate is subjected to column chromatography. The purified extract is structurally and chemically analyzed to find that the molecule is oligosaccharide. The purified oligosaccharide is administered to diabetic patients for 21 days. After the administration of oligosaccharide for 21 days the pancreatic tissues are collected and the blood glucose level in fasting and non fasting states is measured to find that there is significant effect in the blood glucose levels and the pancreatic tissue/cell regeneration after administration of the isolated oligosaccharide. The toxicity tests reveal that the oligosaccharide is non-toxic in nature.

4 Claims, 9 Drawing Sheets

HERBAL EXTRACT COMPOSITION FOR THE TREATMENT OF DIABETES AND A METHOD OF EXTRACTING THE SAME

TECHNICAL FIELD

The embodiments herein generally relate to the bimolecular field and particularly relate to the herbal extracts for the treatment of metabolic disorder. The embodiments herein more particularly relate to a herbal extract composition for the treatment of diabetes and a method of extracting the herbal biomolecule from *Rosa arvensis*.

DESCRIPTION OF THE RELATED ART

Diabetes mellitus is a common and serious disease characterized by hyperglycemia. The World Health Organization (WHO) estimates that more than 190 million people worldwide have diabetes and this number is constantly on the rise. Diabetes mellitus is characterized by hyperglycemia. The disease can be divided into two major subclasses-insulin-dependent diabetes mellitus (IDDM) also known as Type I diabetes and non-insulin dependent diabetes mellitus (NIDDM) also known as Type II diabetes.

Insulin-dependent diabetes mellitus (IDDM) results from insulin deficiency caused by cell-mediated autoimmune destruction of pancreatic beta cells and generally develops in the young age. IDDM affects the beta cells of pancreas and as a result insufficient insulin is secreted. The IDDM accounts for approximately 10-15% of the diabetic population worldwide.

The Type II diabetes occurs in early age group in Indian population as compared to population in western world. The non-insulin dependent diabetes mellitus (NIDDM) results from a variable combination of insulin deficiency and generally develops in adults. Currently the NIDDM accounts for over 85% of the diabetic population worldwide. According to the current opinion on NIADDM, the NIADDM is a complex disease that is influenced by more than a single gene or the environment factors including obesity, lack of physical activity. The diet also plays a strong role in the development of the type-II diabetes mellitus.

The diabetes mellitus is an insidious disease for which there is presently no cure. Mammals afflicted with diabetes mellitus will (unless the glucose level in the blood is controlled) ultimately suffer heart attack, strokes, loss of eye sight, renal failure, loss of limbs due to a non healable injury and ultimately may die as the result of this disease. Human who suffer from this disease usually have blood glucose levels of higher than 150 and are thus termed as "insulin-dependent" and those with glucose levels of 110-140 who are termed as "non-insulin dependent".

Insulin-dependent diabetes must have insulin administer to them in a very rigorous, disciplined manner and must have snacks between meals since it is necessary to maintain the proper level of insulin in the blood stream. There are undesirable side effects experienced if the insulin level is too high and the disease will continue to be unabated, if the insulin level is too low.

People affected with the non-insulin dependent diabetic must follow a disciplined program of diet and exercise to avoid the necessity of taking medication to control blood glucose levels. However, many non-insulin dependent diabetic patients experience difficulty in conscientiously following such program and will ultimately fall into the insulin-dependent category sooner or later.

Current therapies for the management of Type II diabetes include stimulation of insulin secretion from the remaining beta cells through administration of sulfonylureas, meglitinides and D-phenylalanine derivatives. The administration of this group of therapeutic agents lowers the blood glucose level to such an extent that it may lead to hypoglycemia.

Another therapy includes a reduction of hepatic glucose production by administering metformin. The metformin is known to cause several side effects such as gastrointestinal problems such as lactic acidosis, impaired liver or kidney and improper absorption of Vit B12 which may lead to other metabolic malfunctions. Yet another therapy is to reduce the insulin resistance by administering thiazolidinediones. The thiazolidinediones have side effects like water retention, edema and weight gain.

Further therapies include controlling of post-prandial glucose excursions by increasing post-meal insulin release. This is done by administering incretin-based therapies. The side effect of this therapy is nausea, vomiting and diarrhea. Another therapy decreases a post-meal glucose level by suppressing the glucagon release. In this therapy, amylin analogues are mainly administered but this therapy causes the side effects of vomiting, nausea and low blood sugar level.

Another therapy reduces the digestion and absorption of complex saccharides by an administration of alpha-glucosidase inhibitors. The alpha-glucosidase inhibitor induces gastrointestinal problems. Secondly, these inhibitors are expensive. Another therapy involves administering colesevelam to induce bile acid binding sequestering. The colesevelam is known to cause headache, flatulence, constipation, vomiting, diarrhea, dyspepsia, abdominal pain, abnormal stool. The diabetes is a progressive disease in nature and the progressive B-cell failure in Type 2 diabetes, which is the main pathophysiological issues of the diseases, is not addressed by the current therapies.

Hence there is a need for an herbal extract comprising a natural, holistic, edible composition that serves as a hypoglycemic agent to maintain the blood glucose levels below the levels obtainable with an insulin administration. There is yet another need for an herbal extract which does not cause any side effects and is comparatively non-expensive. Such need has especially been true for heavy or overweight persons or the persons suffering from side effects on administration of insulin or synthetic hypoglycemic preparations or the persons with life styles that do not permit the persons to undergo a rigorous exercise/diet program throughout their lives or the persons unwilling to undergo a rigorous exercise/diet program throughout their lives.

The above mentioned shortcomings, disadvantages and problems are addressed herein and which will be understood by reading and studying the following specification.

OBJECTIVES OF THE EMBODIMENTS

The primary object of the embodiments herein is to provide a simple, easy and cost effective method for isolation and purification of oligosaccharide molecule for the treatment of diabetes.

Another object of the embodiments herein is to provide a new oligosaccharide molecule which has a capability of regeneration of beta cells in pancreas.

Yet another object of the embodiments herein is to provide a new oligosaccharide molecule which has no side effects.

Yet another object of the embodiments herein is to provide a new oligosaccharide molecule which is easy to isolate and cheaper.

Yet another object of the embodiments herein is to provide a new oligosaccharide molecule which is administered orally or by injection.

Yet another object of the embodiments herein is to provide a new oligosaccharide molecule which has no toxicity.

Yet another object of the embodiments herein is to provide a new oligosaccharide molecule which is produced from herbs and purified from a single active material.

These and other objects and advantages of the embodiments herein will become readily apparent from the following detailed description taken in conjunction with the accompanying drawings.

SUMMARY

The various embodiments herein provide a herbal extract composition from *Rosa arvensis* for a treatment of diabetes and a method for isolation and purification of a novel oligosaccharide molecule from *Rosa arvensis* for the treatment of diabetes.

According to an embodiment herein, a herbal extract composition for treatment of diabetics comprise an oligosaccharide composition extracted from ripe fruits of *Rosa arvensis*.

According to an embodiment herein, the oligosaccharide composition has a chemical formula and chemical structure represented by According to an embodiment herein, the oligosaccharide is a modified pectin with a low molecular weight, and wherein a structure of modified oligosaccharide comprises a plurality of galacturan units and an arabinan moiety, and wherein a first unit in the plurality of galacturan units is simple galacturonic acid with m/z 176, and wherein the first unit is linked by 1-4 linkage to a second unit, and wherein the second unit is a modified galacturonic acid with acetyl (O-methyl ester ($CH_3$—COO, acetyl) at a position of 2 or 3 (carbon 2 or 3) and methoxycarbonyl (CH3 instead of H) at a position of 5 (carbon 5), and wherein remaining units in the plurality of galacturan units are methoxy carbonyl galacturonic acid, having 1-4 linkage.

According to one embodiment herein, a method for isolation and purification of a novel oligosaccharide molecule from *Rosa arvensis* for the treatment of diabetes comprises collection of ripe fruits of *Rosa arvensis* and the ripe fruits of *Rosa arvensis* are collected from Kermanshah province in western Iran in one embodiment. The species of plant are identified and authenticated. Further the collected fruits are dried in a hot air circulation. A powder of dried fruits is prepared and subjected to de-ionized water to get an extract. The extract is then filtered and subjected to a column of silica gel of G 60 to remove the unwanted materials. The eluent is collected and partitioned two times against a triple volume of ethanol. After filtration, the filtrate is fractionated using a silica gel flash column and by employing an ethanol-water mixture for conditioning. The first fractionate is passed over a membrane using flash column chromatography and wherein the membrane is sephadex LH 20 and then further purified on a column filled with a silica gel and wherein the silica gel is RP-18 to obtain a purified oligosaccharide. The purified oligosaccharide is structurally analyzed using a high performance liquid chromatography diode array detector tandem mass spectrometry (HPLC-DAD MS/MS), Infra red radiation (IR) system and nuclear magnetic resonance (NMR) system.

According to an embodiment herein, the oligosaccharide composition is administered to diabetic patients in a concentration of 8-40 mg/kg.

According to an embodiment herein, the oligosaccharide composition is administered to diabetic patients for a period of at least 21 days.

According to one embodiment herein, the proton and carbon NMR study reveal that the active material is an oligosaccharide and the oligosaccharide is a modified pectin with a low molecular weight and the modified pectin comprises a plurality of units of galacturan and arabinan moiety. The LC-MS/MS technique shows that the plurality of the units of galacturan comprises a first unit and wherein the first unit is simple galacturonic acid with m/z 176 that is linked via 1-4 linkage to a second unit. Wherein the second unit is a modified galacturonic acid with acetyl (O-methyl ester ($CH_3$—COO, acetyl) at a position of 2 or 3 methoxycarbonyl ($CH_3$ instead of H) at position of 5. The remaining units are methoxycarbonyl galacturonic acid with 1-4 linkage.

According to one embodiment herein, the oligosaccharide is administered to rats after purification and structural analysis of the oligosaccharide. The eight week old Wistar rats, weighing from 200-250 gm are purchased from Pasteur institute (Tehran, Iran). The animals are kept on a standard diet with free access to water and food throughout the study. All treatments and maintenance of the animals are carried out in accordance with the principles of laboratory animal care. Further diabetes is induced in the animals except the controls by a single intraperitoneal injection of STZ (60 mg/kg) freshly dissolved in citrate buffer of 5 mmol/L and a pH of 4.5. After an elapse of 48 hrs since the injection of streptozocin (STZ), the diabetes is confirmed by measuring the glucose levels in the blood samples. The blood samples are obtained from the retro-orbital sinus of the animals under diethyl ether-induced light anesthesia with GlucoDr Glucometer (Allmedicus; Germany). The rats with blood glucose levels between the range of 300-400 are selected and randomized into different groups. The first group comprises ten rats and is administered with the oligosaccharide. The second group comprises eight rats and the rats in the second group are injected with the citrate buffer. This group is called a negative control group. The amount of citrate buffer administered to the second group and the amount of oligosaccharide administered to the first group are same or equal. The rats in the oligosaccharide treated groups are given different doses (8-40 mg/kg) of the pure materials dissolved in distilled water twice daily for 21 days starting from the third day since the STZ injection.

According to one embodiment herein, the positive controls or the rats in the first group with the same levels of blood glucose received either glybenclamide (5 mg/kg/day) or metformin (15 mg/kg/day) for the same protocol and period. The molecules of glybenclamide or metformin are administered intraperitoneally or by oral gavage and stopped after three weeks. The water intake and urine volume are measured throughout the study. Twenty four hours after the administration of the last dose of oligosaccharide, the blood glucose is monitored in fasting and non-fasting states. The body and pancreas weights are compared. Oral glucose tolerance test, insulin tolerance test, gluconeogenesis inhibition test and alfa glucosidase inhibition tests are conducted.

According to one embodiment herein, three randomly-selected rats in the oligosaccharide administered group and cured are anesthetized by a diethyl ether. The selected rats are killed to collect the blood and the pancreatic samples. The remaining cured animals are killed three and six months after the withdrawal of the drugs by the same method to collect the blood and the pancreatic samples. The diethyl ether anesthesia is administered and the pancreas removed through a midline abdominal incision is weighed, washed with ice cold normal saline and divided into two parts. One part is quickly frozen with liquid nitrogen for PCR study and the other part is spread flat and fixed in 10% neutral buffered formalin for 48 hrs. The fixing of pancreatic sample involves resectioning, dehydrating in graded ethanol, clearing in xylene and paraffin embedding by standard protocol.

According to one embodiment herein, the paraffin blocks are cut into 5 μm sections with a rotary microtome, deparafinized with xylene, rehydrated with the graded ethanol and stained with hematoxylin and eosin, for the histopathological studies. The stained sections are placed in Tris-buffered saline (TBS) with a pH 9 for 15 minutes. The stained samples are treated with $H_2O_2$ for ten minutes to block the endogenous peroxidase activity. The slides are rinsed with TBS and incubated with polyclonal guinea pig anti insulin (Dako, Denmark A/S) for 60 min at a room temperature. After the slides are rinsed, the slides are treated with 3'-diaminobenzidine chromogen solution for 10 min at a room temperature. The slides are then counterstained with hematoxylin, for 30 minutes. After an elapse of 30 minutes, the slides are rinsed in tap water, dehydrated, placed in xylene, mounted and photographed.

According to one embodiment herein, the PCR study comprises a RNA extraction, a cDNA synthesis and a reverse transcription polymerase chain reaction (RT-PCR). For the RNA extraction, 100 mg of the pancreatic tissue is homogenized with 1 ml ice cold RNX™ (-Plus) isolation reagent (Cinnagen Co., Iran) according to the manual of the manufacturer. After homogenization and incubation at a room temperature of 25° C. for 5 min, 0.2 ml chloroform is added and incubated for 5 min on ice. The sample is centrifuged at 12000 G (centrifugal force in gravities) at 4° C. for 15 min. After centrifugation, the aqueous phase is transferred to a new tube and an equal volume of isopropanol of about 0.5 ml is added. The tube is incubated for 15 min on ice and centrifuged at 12000 G at 4° C. for 15 min. The RNA is precipitated at the bottom of the tube to obtain a pellet and the pellet is washed with 1 ml of 75% ethanol. After the addition of ethanol, the tube is subjected to centrifugation for 8 min at 75000 g at 4° C. The RNA pellet is dried for 15-30 min at the room temperature and resuspended in 30-50 μl of 1 mM EDTA (with 0.01% DEPC treated water, pH 7). The sample is incubated for 10 min at 60° C. The extracted RNA is visualized and verified by electrophoresis on 1% agarose gel. The RNA concentration and RNA purity is assessed using a UV-VIS spectrophotometer at 260 and 280 nm. The purity and concentration of RNA is measured based on 260/280 ratio.

According to one embodiment herein, for the cDNA synthesis, 2 μl of total extracted RNA is used for the reverse transcription using oligo-dT primer with Omni script reverse transcriptase (Qiagen). Three micro liters of reverse-transcription product is used as a template for the PCR.

According to one embodiment herein, the reverse transcription polymerase chain reaction (RT-PCR) is performed with master cycler gradient eppendorf. The RT-PCR is performed for the amplification of a 554 bp fragment. For the RT-PCR, 20 pmol of each primer, 200 μm dNTP's, 1.5 mM $MgCl_2$, 1 μl Taq polymerase enzyme in a 10×PCR buffer and 300-500 ng genomic DNA in total volume of 25 μl are taken for the PCR reaction mixture. The reaction mixture is subjected to RT-PCR for 5 min at 94° C., 35 cycles of 30 s at 94° C., 45 s at 50° C. and 1:15 min at 72° C. and then, 10 min at 72° C. for final extension.

According to one embodiment herein, the acute, sub acute and sub chronic toxicological tests are performed based on the standard protocols. For the acute sequential design procedure of LD-50, limit dose test were done and mortality rate is recorded up to 14 days. Sub acute and sub chronic toxicological tests are performed by an administration of 160 mg/kg (10 folds of therapeutics dose) for 21 and 52 days respectively. For the animals in the control groups, distilled water is administered by the same protocols. At the end of the time period, the rats are killed and the body specimens are collected for the determination of biochemical, hematological and pathological parameters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE EMBODIMENTS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a herbal extract composition from *Rosa arvensis* for a treatment of diabetes and a method for isolation and purification of a novel oligosaccharide molecule from *Rosa arvensis* for the treatment of diabetes.

According to an embodiment herein, a herbal extract composition for treatment of diabetics comprise an oligosaccharide composition extracted from ripe fruits of *Rosa arvensis*.

According to an embodiment herein, the oligosaccharide composition has a chemical formula and chemical structure represented by According to an embodiment herein, the oligosaccharide is a modified pectin with a low molecular weight, and wherein a structure of modified oligosaccharide comprises a plurality of galacturan units and an arabinan moiety, and wherein a first unit in the plurality of galacturan units is simple galacturonic acid with m/z 176, and wherein the first unit is linked by 1-4 linkage to a second unit, and wherein the second unit is a modified galacturonic acid with acetyl (O-methyl ester ($CH_3$-000, acetyl) at a position of 2 or 3 (carbon 2 or 3) and methoxycarbonyl (CH3 instead of H) at a position of 5 (carbon 5), and wherein remaining units in the plurality of galacturan units are methoxy carbonyl galacturonic acid, having 1-4 linkage.

According to one embodiment herein, a method for isolation and purification of a novel oligosaccharide molecule from *Rosa arvensis* for the treatment of diabetes comprises collection of ripe fruits of *Rosa arvensis* and the ripe fruits of *Rosa arvensis* are collected from Kermanshah province in western Iran in one embodiment. The species of plant are identified and authenticated. Further the collected fruits are dried in a hot air circulation. A powder of dried fruits is prepared and subjected to de-ionized water to get an extract. The extract is then filtered and subjected to a column of silica gel of G 60 to remove the unwanted materials. The eluent is collected and partitioned two times against a triple volume of ethanol. After filtration, the filtrate is fractionated using a silica gel flash column and by employing an ethanol-water mixture for conditioning. The first fractionate is passed over a membrane using flash column chromatography and wherein the membrane is sephadex LH 20 and then further purified on a column filled with a silica gel and wherein the silica gel is RP-18 to obtain a purified oligosaccharide. The purified oligosaccharide is structurally analyzed using a high performance liquid chromatography diode array detector tandem mass spectrometry (HPLC-DAD MS/MS), Infra red radiation (IR) system and nuclear magnetic resonance (NMR) system.

According to an embodiment herein, the oligosaccharide composition is administered to diabetic patients in a concentration of 8-40 mg/kg.

According to an embodiment herein, the oligosaccharide composition is administered to diabetic patients for a period of at least 21 days.

According to one embodiment herein, the proton and carbon NMR study reveal that the active material is an oligosaccharide and the oligosaccharide is a modified pectin with a low molecular weight and the modified pectin comprises a plurality of units of galacturan and arabinan moiety. The LC-MS/MS technique shows that the plurality of the units of galacturan comprises a first unit and wherein the first unit is simple galacturonic acid with m/z 176 that is linked via 1-4 linkage to a second unit. Wherein the second unit is a modified galacturonic acid with acetyl (O-methyl ester ($CH_3$—COO, acetyl) at a position of 2 or 3 methoxycarbonyl ($CH_3$ instead of H) at position of 5. The remaining units are methoxycarbonyl galacturonic acid with 1-4 linkage.

The oligosaccharide structure is shown below:

According to one embodiment herein, the oligosaccharide is administered to rats after purification and structural analysis of the oligosaccharide. The eight week old Wistar rats, weighing from 200-250 gm are purchased from Pasteur institute (Tehran, Iran). The animals are kept on a standard diet with free access to water and food throughout the study. All treatments and maintenance of the animals are carried out in accordance with the principles of laboratory animal care. Further diabetes is induced in the animals except the controls by a single intraperitoneal injection of STZ (60 mg/kg) freshly dissolved in citrate buffer of 5 mmol/L and a pH of 4.5. After an elapse of 48 hrs since the injection of streptozocin (STZ), the diabetes is confirmed by measuring the glucose levels in the blood samples. The blood samples are obtained from the retro-orbital sinus of the animals under diethyl ether-induced light anesthesia with GlucoDr Glucometer (Allmedicus; Germany). The rats with blood glucose levels between the range of 300-400 are selected and randomized into different groups. The first group comprises ten rats and is administered with the oligosaccharide. The second group comprises eight rats and the rats in the second group are injected with the citrate buffer. This group is called a negative control group. The amount of citrate buffer administered to the second group and the amount of oligosaccharide administered to the first group are same or equal. The rats in the oligosaccharide treated groups are given different doses (8-40 mg/kg) of the pure materials dissolved in distilled water twice daily for 21 days starting from the third day since the STZ injection.

According to one embodiment herein, the positive controls or the rats in the first group with the same levels of blood glucose received either glybenclamide (5 mg/kg/day) or metformin (15 mg/kg/day) for the same protocol and period. The molecules of glybenclamide or metformin are administered intraperitoneally or by oral gavage and stopped after three weeks. The water intake and urine volume are measured throughout the study. Twenty four hours after the administration of the last dose of oligosaccharide, the blood glucose is monitored in fasting and non-fasting states. The body and pancreas weights are compared. Oral glucose tolerance test, insulin tolerance test, gluconeogenesis inhibition test and alfa glucosidase inhibition tests are conducted.

According to one embodiment herein, the TABLE 1 below shows the insulin levels (ng/ml) in untreated negative controls that received no molecule, while the test group received oligosaccharide and the positive control received either metformin or glybenclamide.

| | Insulin levels ng/ml (SD)\groups | | | | |
|---|---|---|---|---|---|
| | Control | Diabetic untreated group | Oligosaccharide Treated group (16 mg/kg) | Metformin treated group | Glybenclamide treated group |
| Befor treatment | 2.7 (0.08) | 0.7(0.06) | 0.85(0.08) | 0.85(0.1) | 0.8(0.05) |
| 21 days after treatment | 2.6(0.09) | ND | 1.2(0.06) | 0.4(0.06) | 0.3(0.04) |
| 30 days after withdrawal of the treatment | 2.8(0.1) | ND | 2.4(0.09) | ND | ND |

ND = Not detectable

According to one embodiment herein, the TABLE 2 below shows the fasting blood sugar levels (mg/dl) in different groups of mice. The untreated negative controls received no molecule, while the test group received oligosaccharide and the positive control received either metformin or glybenclamide.

| | FBS levels mg/dl (SD)\groups | | | | |
|---|---|---|---|---|---|
| | Control | Diabetic untreated group | Oligosaccharide Treated group (16 mg/kg) | Metformin treated group | Glybenclamide treated group |
| Befor treatment | 89(10) | 300(25) | 325(32) | 325(20) | 288(35) |
| 21 days after treatment | 92(8) | 312(33) | 110(10) | 215(42) | 200(55) |
| 30 days after withdrawal of the treatment | 94(6) | 305(42) | 103(6) | 332(38) | 305(47) |

According to one embodiment herein, the TABLE 3 below shows the post prandial blood sugar levels (mg/dl) in different groups of mice. The untreated negative controls received no molecule, while the test group received oligosaccharide and the positive control received either metformin or glybenclamide.

| | BS levels mg/dl (SD)\groups | | | | |
|---|---|---|---|---|---|
| | Control | Diabetic untreated group | Oligosaccharide Treated group (16 mg/kg) | Metformin treated group | Glybenclamide treated group |
| Befor treatment | 135(22) | 352(41) | 364(41) | 375(57)(20) | 360(41) |
| 21 days after treatment | 142(12) | 412(52) | 150(21) | 261(49) | 250(63) |
| 30 days after withdrawal of the treatment | 148(18) | 432(68) | 144(18) | 375(59) | 363(64) |

According to one embodiment herein, in acute toxicological studies of the oligosaccharide, no mortality rate was observed up to two weeks after the administration of 5 g/kg to the animals. Thus the agent is considered as non-toxic material. The TABLES 4-7 show the results of biochemistry and hematology parameters in the toxicological studies after the administration of 160 mg/kg with the time periods of 15 days and 28 days. In pathologic studies, no abnormality is observed following the administration of the oligosaccharide.

According to one embodiment herein, the TABLE 4 below shows the results of sub acute toxicity tests (hematological parameters) 15 days after the administration of oligosaccharide.

| Sub acute (Hematology, 15 days) | | | |
|---|---|---|---|
| Parameters | Controls | 16 mg/kg | 160 mg/kg |
| PLT(×105/ml) | 9.5 ± 1.9 | 9.4 ± 1.3 | 9.3 ± 2.1 |
| MCHC (g/dl) | 36.5 ± 3.9 | 33.8 ± 4.7 | 33.9 ± 5.1 |
| MCH(pg) | 17.66 ± 4.1 | 18.1 ± 4.9 | *<br>18.3 ± 3.9 |
| MCV(Fl) | 53.31 ± 2.1 | 54.51 ± 3.2 | *<br>55.9 ± 2.5 |
| HCT (%) | 43.1 ± 3.4 | 42.8 ± 2.9 | 42.6 ± 1.1 |
| Hb(g/dl) | 14.4 ± 0.9 | 14.3 ± 0.6 | 14.1 ± 0.3 |
| RBC(×106/ml) | 8.12 ± 3.1 | 8.08 ± 1.3 | *<br>7.98 ± 1.9 |
| WBC(×103/ml) | 11.1 ± 2.4 | 10.5 ± 3.3 | *<br>8.9 ± 2.9 |

According to one embodiment herein, the TABLE 5 below shows the results of sub acute toxicity tests (biochemical parameters) in 15 days after the administration of oligosaccharide.

| Sub acute toxitity tests (Biochemistry, 15 days) | | | |
|---|---|---|---|
| Parameters | Controls | 16 mg/kg | 160 mg/kg |
| Glucose(mg/dl) | 118.11 ± 9.7 | 113.61 ± 16.4 | 109.3 ± 10.4 |
| Urea(mg/dl) | 53.28 ± 6.11 | 54.71 ± 9.98 | 54.87 ± 6.63 |
| Cr(mg/dl) | 0.67 ± 0.03 | 0.66 ± 0.02 | 0.65 ± 0.04 |
| Uric acid(mg/dl) | 1.63 ± 0.22 | 1.62 ± 0.32 | 1.58 ± 0.25 |
| Chol(mg/dl) | 77.64 ± 11.73 | 82.15 ± 22.11 | 81.11 ± 14.31 |
| TG(mg/dl) | 110.32 ± 11.02 | 98.41 ± 15.63 | 97.99 ± 17.49 |
| LDH(u/l) | 1839.4 ± 703.5 | 2019.7 ± 390.4 | 2110.5 ± 504.7 |
| CPK(u/l) | 1211.4 ± 297.8 | 1341.5 ± 311.12 | 1398.3 ± 115.5 |
| AST(u/l) | 161.1 ± 19.61 | 169.41 ± 17.5 | 177.51 ± 24.2 |
| ALT(u/l) | 144.71 ± 16.11 | 146.33 ± 18.41 | 142.31 ± 21.32 |
| ALP(u/l) | 432.12 ± 60.32 | 442.69 ± 90.54 | 351.37 ± 63.21 |
| Alb(g/dl) | 3.23 ± 0.04 | 3.22 ± 0.04 | 3.24 ± 0.05 |

According to one embodiment herein, the TABLE 6 below shows the results of sub acute toxicity tests (biochemical parameters) in 28 days after the administration of oligosaccharide.

| Sub chronic toxicity tests (Biochemistry, 28 days) | | | |
|---|---|---|---|
| Parameters | Controls | 16 mg/kg | 160 mg/kg |
| Glucose(mg/dl) | 123.17 ± 10.6 | 105.67 ± 17.5 | 101.5 ± 12.5** |
| Urea(mg/dl) | 52.33 ± 5.98 | 53.83 ± 10.94 | 53.83 ± 5.77 |
| Cr(mg/dl) | 0.66 ± 0.02 | 0.65 ± 0.04 | 0.65 ± 0.01 |
| Uric acid(mg/dl) | 1.65 ± 0.37 | 1.65 ± 0.44 | 1.51 ± 0.19 |
| Chol(mg/dl) | 73.66 ± 12.84 | 84.16 ± 25.67 | 82.14 ± 11.66 |
| TG(mg/dl) | 105.17 ± 14.03 | 95.33 ± 25.18 | 103.50 ± 15.51 |
| LDH(u/l) | 1774.5 ± 686.3 | 2150.3 ± 483.7 | 2625.4 ± 622.8* |
| CPK(u/l) | 1163.2 ± 345.5 | 1365.7 ± 298.4 | 1549.7 ± 189.7* |
| AST(u/l) | 158.8 ± 24.63 | 172.67 ± 14.16 | 189.83 ± 33.33 |
| ALT(u/l) | 156.83 ± 17.52 | 136.50 ± 19.91 | 144.2 ± 24.97 |

| Sub chronic toxicity tests (Biochemistry, 28 days) | | | |
|---|---|---|---|
| Parameters | Controls | 16 mg/kg | 160 mg/kg |
| ALP(u/l) | 417.17 ± 70.94 | 448.50 ± 76.23 | 399.50 ± 87.24 |
| Alb(g/dl) | 3.24 ± 0.04 | 3.21 ± 0.09 | 3.25 ± 0.08 |

According to one embodiment herein, the TABLE 7 below shows the results of sub acute toxicity tests (hematological parameters) in 28 days after the administration of oligosaccharide.

| Sub chronic toxicity tests (Hematology, 28 days) | | | |
|---|---|---|---|
| Parameters | Controls | 16 mg/kg | 160 mg/kg |
| PLT (× 10$^5$/ml) | 9.4 ± 2.3 | 9.2 ± 2.4 | 9.1 ± 2.8 |
| MCHC (g/dl) | 33.4 ± 1.38 | 33.9 ± 1.6 | 33.1 ± 0.8 |
| MCH (pg) | 17.6 ± 1.4 | 18.4 ± 1.0 | 19.1 ± 1.0 ** |
| MCV(Fl) | 52.4 ± 3.5 | 54.7 ± 2.1 | 55.2 ± 1.7** |
| HCT (%) | 42.6 ± 2.8 | 41.9 ± 1.9 | 41.1 ± 1.1 |
| Hb (g/dl) | 14.3 ± 1.60 | 14.2 ± 1.4 | 13.7 ± 0.6 |
| RBC (×10$^6$/ml) | 8.1 ± 1.2 | *<br>7.7 ± 1.4 | **<br>7.5 ± 2.3 |
| WBC (×10$^3$/ml) | 11.1 ± 1.4 | 9.6 ± 1.6 | **<br>7.9 ± 1.7 |

According to one embodiment herein, three randomly-selected rats in the oligosaccharide administered group and cured are anesthetized by a diethyl ether. The selected rats are killed to collect the blood and the pancreatic samples. The remaining cured animals are killed three and six months after the withdrawal of the drugs by the same method to collect the blood and the pancreatic samples. The diethyl ether anesthesia is administered and the pancreas removed through a midline abdominal incision is weighed, washed with ice cold normal saline and divided into two parts. One part is quickly frozen with liquid nitrogen for PCR study and the other part is spread flat and fixed in 10% neutral bufferd formalin for 48 hrs. The fixing of pancreatic sample involves resectioning, dehydrating in graded ethanol, clearing in xylene and paraffin embedding by standard protocol.

According to one embodiment herein, the paraffin blocks are cut into 5 μm sections with a rotary microtome, deparafinized with xylene, rehydrated with the graded ethanol and stained with hematoxylin and eosin, for the histopathological studies. The stained sections are placed in Tris-buffered saline (TBS) with a pH 9 for 15 minutes. The stained samples are treated with $H_2O_2$ for ten minutes to block the endogenous peroxidase activity. The slides are rinsed with TBS and incubated with polyclonal guinea pig anti insulin (Dako, Denmark A/S) for 60 min at a room temperature. After the slides are rinsed, the slides are treated with 3'-diaminobenzidine chromogen solution for 10 min at a room temperature. The slides are then counterstained with hematoxylin, for 30 minutes. After an elapse of 30 minutes, the slides are rinsed in tap water, dehydrated, placed in xylene, mounted and photographed.

According to one embodiment herein, the PCR study comprises a RNA extraction, a cDNA synthesis and a reverse transcription polymerase chain reaction (RT-PCR). For the RNA extraction, 100 mg of the pancreatic tissue is homogenized with 1 ml ice cold RNX™ (-Plus) isolation reagent (Cinnagen Co., Iran) according to the manual of the manufacturer. After homogenization and incubation at a room temperature of 25° C. for 5 min, 0.2 ml chloroform is added and incubated for 5 min on ice. The sample is centrifuged at 12000 G (centrifugal force in gravities) at 4° C. for 15 min. After centrifugation, the aqueous phase is transferred to a new tube and an equal volume of isopropanol of about 0.5 ml is added. The tube is incubated for 15 min on ice and centrifuged at 12000 G at 4° C. for 15 min. The RNA is precipitated at the bottom of the tube to obtain a pellet and the pellet is washed with 1 ml of 75% ethanol. After the addition of ethanol, the tube is subjected to centrifugation for 8 min at 75000 g at 4° C. The RNA pellet is dried for 15-30 min at the room temperature and resuspended in 30-50 µl of 1 mM EDTA (with 0.01% DEPC treated water, pH 7). The sample is incubated for 10 min at 60° C. The extracted RNA is visualized and verified by electrophoresis on 1% agarose gel. The RNA concentration and RNA purity is assessed using a UV-VIS spectrophotometer at 260 and 280 nm. The purity and concentration of RNA is measured based on 260/280 ratio.

According to one embodiment herein, for the cDNA synthesis, 2 µl of total extracted RNA is used for the reverse transcription using oligo-dT primer with Omni script reverse transcriptase (Qiagen). Three micro liters of reverse-transcription product is used as a template for the PCR.

According to one embodiment herein, the reverse transcription polymerase chain reaction (RT-PCR) is performed with master cycler gradient eppendorf. The RT-PCR is performed for the amplification of a 554 bp fragment. For the RT-PCR, 20 pmol of each primer, 200 µm dNTP's, 1.5 mM MgCl$_2$, 1 µl Taq polymerase enzyme in a 10×PCR buffer and 300-500 ng genomic DNA in total volume of 25 µl are taken for the PCR reaction mixture. The reaction mixture is subjected to RT-PCR for 5 min at 94° C., 35 cycles of 30 s at 94° C., 45 s at 50° C. and 1:15 min at 72° C. and then, 10 min at 72° C. for final extension.

The primers used for the reverse transcription polymerase chain reaction (RT-PCR) are shown below:

```
P1: GGTGCCAGAGTTCAGTGCTA
P2: TTATTCTCCTCCGGTTCTGC

P1: ACACAGCTCTACAAGGACCC
P2: CACTTCGTATGGGGAGATGT
```

According to one embodiment herein, the acute, sub acute and sub chronic toxicological tests are performed based on the standard protocols. For the acute sequential design procedure of LD-50, limit dose test were done and mortality rate is recorded up to 14 days. Sub acute and sub chronic toxicological tests are performed by an administration of 160 mg/kg (10 folds of therapeutics dose) for 21 and 52 days respectively. For the animals in the control groups, distilled water is administered by the same protocols. At the end of the time period, the rats are killed and the body specimens are collected for the determination of biochemical, hematological and pathological parameters.

Figure 1:
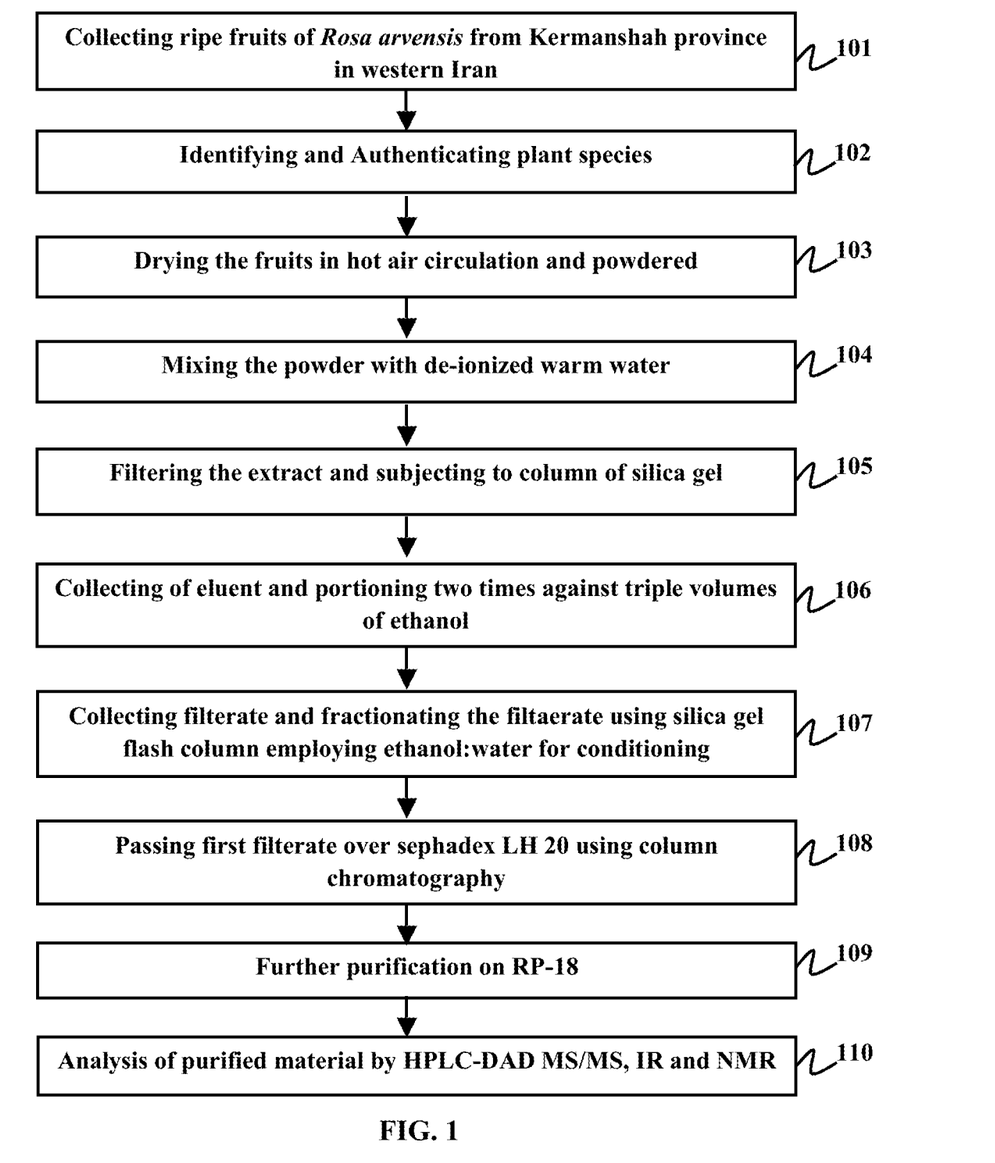
FIG. 1 illustrates a flow chart indicating the process of isolation and purification of an oligosaccharide from *Rosa arvensis*, according to an embodiment herein.

FIG. 1 illustrates a flow chart indicating the process of isolation and purification of an oligosaccharide from *Rosa arvensis*, according to an embodiment herein. The method for isolation and purification of a novel oligosaccharide molecule from *Rosa arvensis* for the treatment of diabetes comprises the collection of ripe fruits of *Rosa arvensis* from Kermanshah province in western Iran (101). The fruits were collected during November-December 2011. The species of plant are identified and authenticated (102). Further the collected fruits are dried with hot air circulation and powdered (103). The powdered dried fruits are subjected to de-ionized warm water (42° C. 10% W/V) to get an extract (104). The extract is then filtered and subjected to a column of silica gel (105). The selected silica gel is G 60 (50*500, 63-200 µm) to remove the unwanted materials. The eluent is collected and partitioned two times against triple volume of ethanol (106). After filtration, the filtrate is fractionated using a silica gel flash column and employing ethanol-water for conditioning (107). The silica gel flash column employed is 50*500, 40-63 µm. The ethanol:water mixture is in the ration 70:30. The first fraction is passed over sephadex LH 20 using flash column chromatography (108). The eluent is further purified with a column of RP-18 (109). The purification the oligosaccharide is structurally analyzed by high performance liquid chromatography diode array detector tandem mass spectrometry (HPLC-DAD MS/MS), Infra red radiation (IR) and nuclear magnetic resonance (NMR) systems (110).

Figure 2:
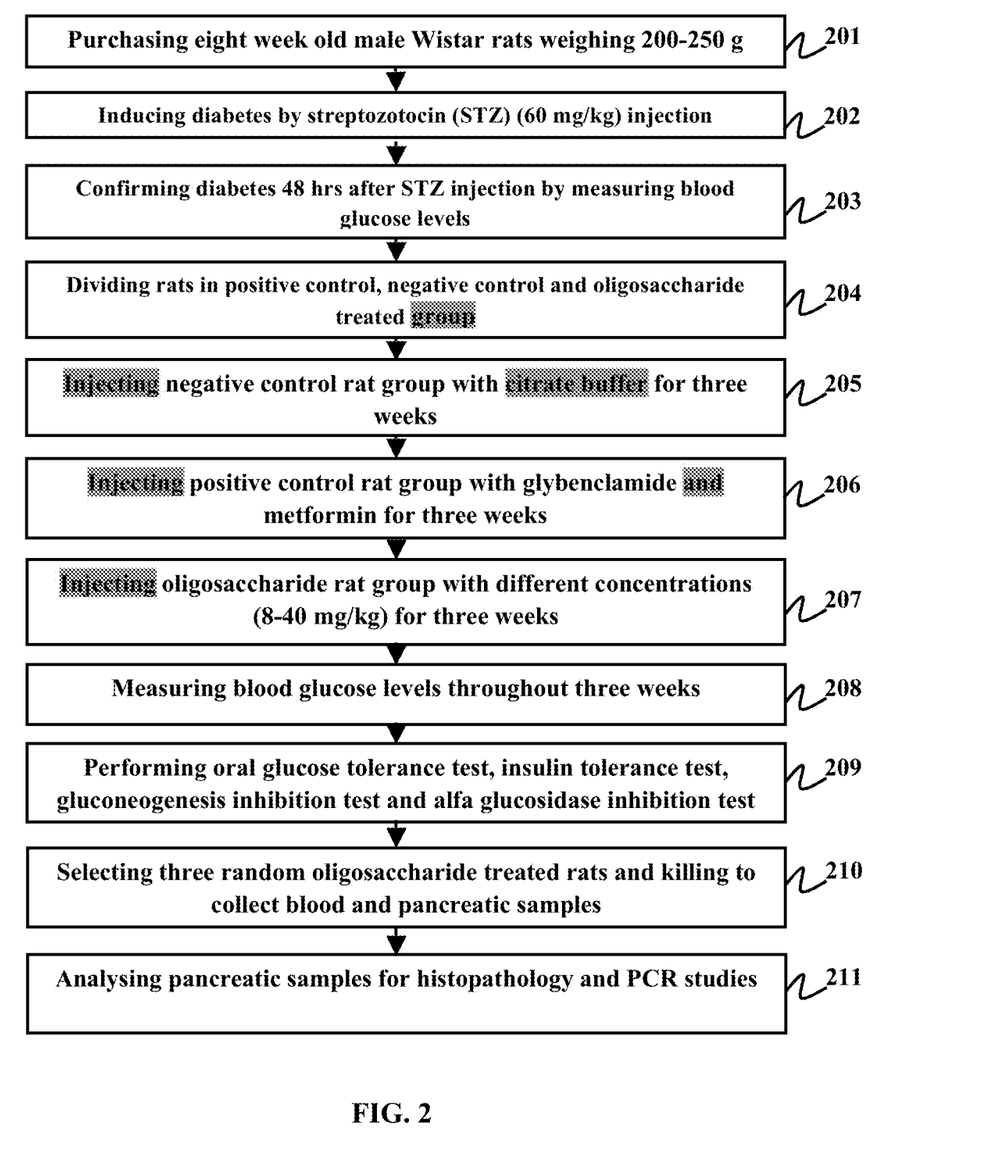
FIG. 2 illustrates a flow chart indicating the administration and testing of the anti-diabetic effect of oligosaccharide molecule, according to an embodiment herein.

FIG. 2 illustrates a flow chart indicating the administration and testing of the anti-diabetic effect of oligosaccharide molecule, according to an embodiment herein. The process of administering and testing the antidiabetic effect of oligosaccharide molecule comprises purchasing eight week old male Wistar rats weighing 200-250 gm (201). The rats are purchased from Pasteus Institute (Tehran, Iran). The rats are kept on a standard diet with free access to water and food throughout the study. All the treatments and maintenance of the animals is carried out in accordance with the principles of laboratory animal care. Inducing diabetes by stretozotocin (STZ) 60 mg/kg injection (202). The diabetes is induced in all rats except in the rats in the control group by intraperitoneal injection of STZ freshly dissolved in 5 mmol/L citrate buffer (pH 4.5). The diabetes is confirmed 48 hrs after STZ infection by measuring blood glucose levels (203). The blood from rats is obtained from retro-orbital sinus of the animals under diethyl ether induced light anesthesia with GlucoDr Glucometer (Allmedicus; Germany). The rats with blood glucose levels between the range of 300-400 are selected. The rats in positive control, negative control and oligosaccharide treated group are divided into different groups (204). The rats in the negative control group are injected with citrate buffer for three weeks (205). The rats in the positive control group are injected with glybendamide and metformin for three weeks (206). The rats in the oligosaccharide group are injected with different concentration (8-40 mg/kg) of oligosaccharide for three weeks (207). The oligosaccharide is dissolved in distilled water and administered twice daily after STZ injection induced diabetes. All the treatments are done intraperitoneally or by oral gavage and stopped after three weeks. The blood glucose levels are measured throughout three weeks (208). The water intake and urine volume are measured throughout the study. Twenty four hours after the last dose, the blood glucose is monitored in fasting and non fasting states. The oral glucose tolerance test, insulin tolerance test, gluconeogenesis inhibition test and alpha glucosidase inhibition test are conducted (209). The three random oligosaccharide treated rats are selected and killed to collect blood and pancreatic samples (210). The selected rats are anesthesized by diethyl ether and killed to collect blood and pancreatic samples. The pancreatic samples are analyzed for histopathology and PCR studies (211). The remaining cured animals are killed three and six months after the withdrawal of the drugs. Further the collected pancreatic and blood samples are tested for the diabetic symptoms and blood glucose test (fasting and post-prandial), blood insulin level test.

Figure 3:
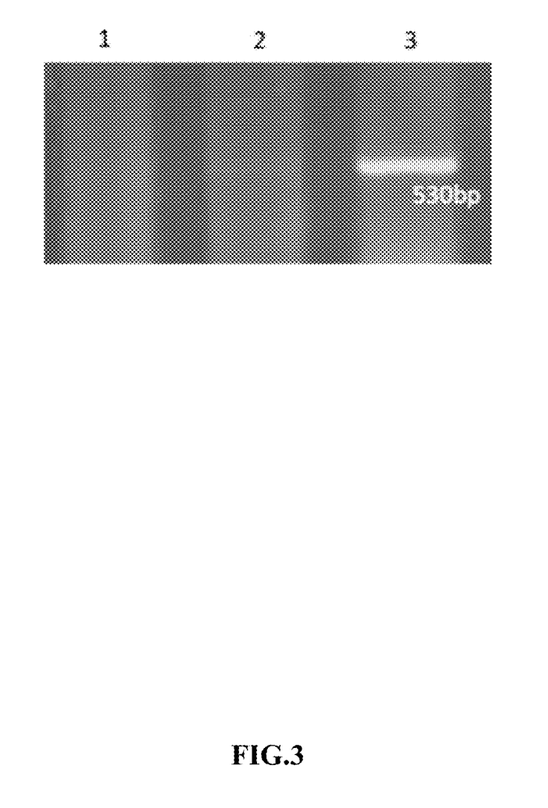
FIG. 3 illustrates a photograph of 1% agarose gel electrophoresis result indicating the extracted RNA, according to the embodiments herein.

FIG. 3 illustrates a photograph of 1% agarose gel electrophoresis result indicating the extracted RNA, according to the embodiments herein. For the RNA extraction, 100 mg of the pancreatic tissue is homogenized with 1 ml ice cold RNX™ isolation reagent (Cinnagen Co., Iran) according to the manual of the manufacture. After homogenization, and incubation at room temperature (25° C.) for 5 minutes, 0.2 ml chloroform is added and incubated for 5 minutes on ice. The sample is centrifuged at 12000 g at 4° C. for 15 minutes. After centrifugation, the aqueous phase is transferred to a new tube and equal volume of isopropanol of about 0.5 ml is added. After incubation for 15 minutes on ice, the tube is centrifuged at 12000 g for 15 min at 4° C. The RNA is precipitated at bottom of the tube to obtain a pellet and the pellet is washed with 1 ml 75% ethanol. After washing the RNA, the tube is subjected to centrifugation for 8 minutes at 75000 g at 4° C. The RNA pellet is briefly dried for 15-20 minutes at room temperature. The RNA pellet is resuspended in 30-50 μl of 1 mM EDTA (with 0.01% DEPC treated water, pH 7). The isolated RNA is incubated for 10 minutes at 60° C. to dissolve preparation of RNA. The RNA extracted is visualized and verified by electrophoresis on 1% agarose gel and RNA concentration and RNA purity is assessed using a UV-vis spectrophotometer at 260 and 280 nm and measurement of 260/280 ratio. FIG. 3 illustrates the RNA of untreated diabetic rat, RNA of non diabetic rat and RNA of herbal extract treated rat (diabetic rat) in 1% agarose gel's well 1, 2 and 3 respectively. The FIG. 3 shows 530 bp of RNA isolated from the pancreas of diabetic rat treated with herbal oligosaccharide extract.

Figure 4:
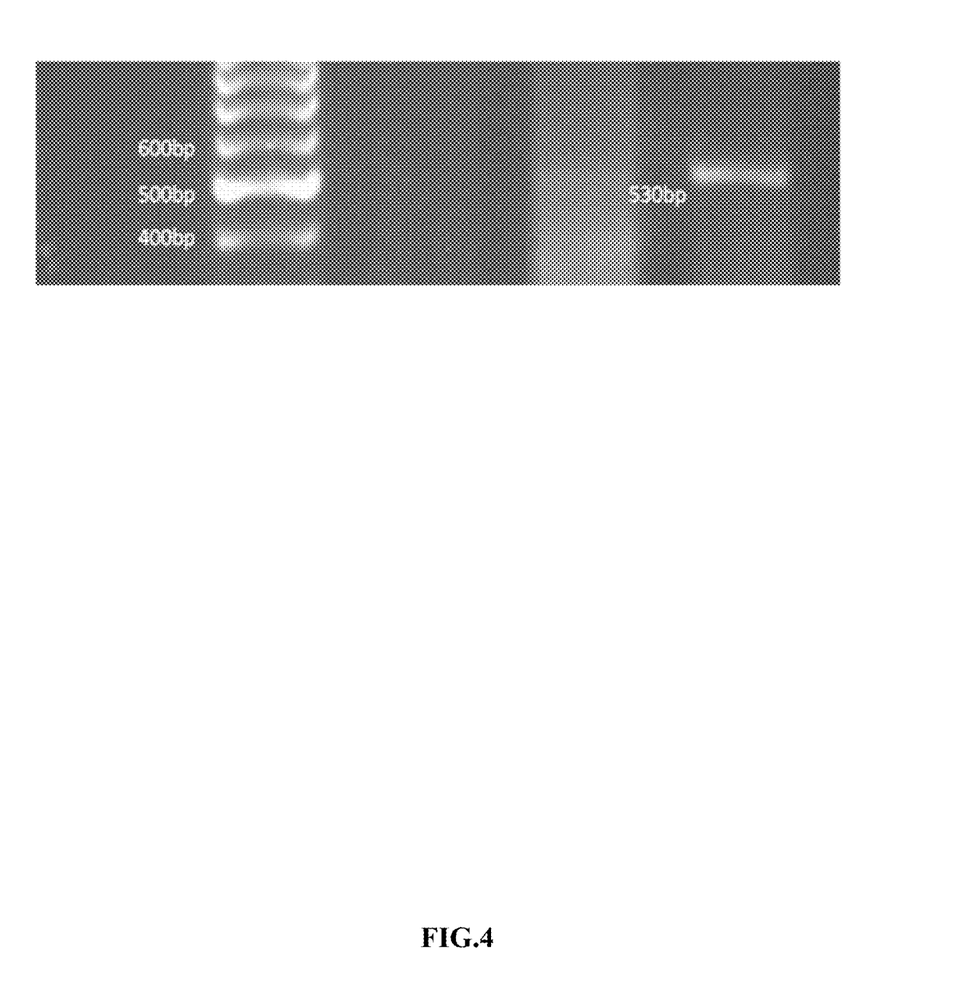
FIG. 4 illustrates a photograph of agarose gel electrophoresis result indicating the marker size and isolated RNA size, according to the embodiments herein.

FIG. 4 illustrates a photograph of agarose gel electrophoresis result indicating the marker size and isolated RNA size, according to the embodiments herein. The FIG. 4 shows the agarose gel with first well loaded with DNA marker, and the third well loaded with the RNA isolated from the pancreas of diabetic rat treated with herbal oligosaccharide extract. The RNA has a length of 530 bp.

Figure 5:
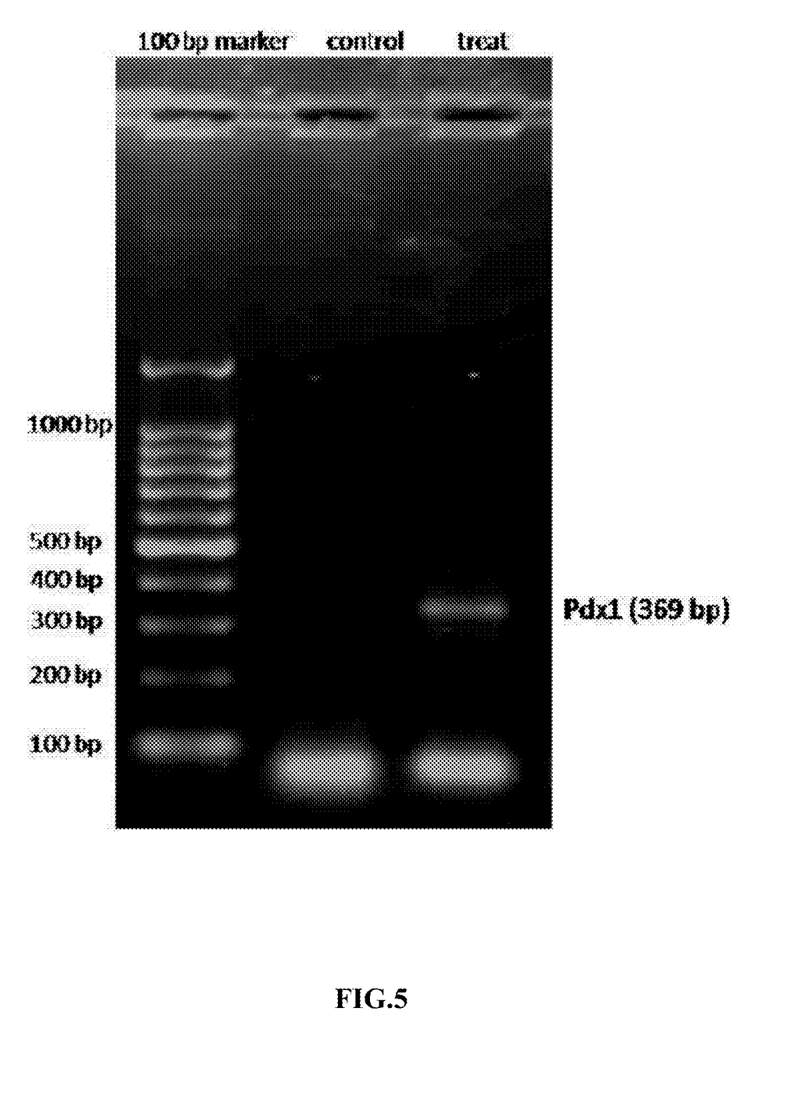
FIG. 5 illustrates is a photograph of agarose gel electrophoresis illustrating the reverse transcription polymerase chain reaction (RT-PCR) results, according to the embodiments herein.

FIG. 5 illustrates is a photograph of agarose gel electrophoresis illustrating the reverse transcription polymerase chain reaction (RT-PCR) results, according to the embodiments herein. The 2 μl of total extracted RNA is used for RT-PCR using oligo-dT primer with Omniscript reverse transcriptase (Qiagen). Three microliters of reverse-transcription product is used as a template for PCR. The RNA isolated from the rat pancreas is subjected to RT-PCR. For the PCR 20 pmol of each primer, 200 μM dNTPs, 1.5 mM $MgCl_2$, 1 μl Taq polymerase enzyme in a 10×PCR buffer and 300-500 ng genomic DNA in total volume of 25 μl. The PCR protocol consisted of 5 min at 94° C., 35 cycles of 30 s at 94° C., 45 s at 50° C. and 1:15 min at 72° C. For the final extension of the nucleotide chain 10 min at 72° C. is maintained in PCR reaction. The FIG. 5 illustrates the agarose gel with first well loaded with 1000 bp molecular marker, second well loaded with control and the third well is loaded with cDNA obtained from the RT-PCR RNA of oligosaccharide treated diabetic rat. The FIG. 5 shows the length of the cDNA is 369 bp.

FIG. 6A-6D illustrate the light microscope photographs of pancreatic islets, according to an embodiment herein. Under the diethyl ether anesthesia and through a midline abdominal incision, the pancreas is removed, weighed, washed with ice-cold normal saline and divided into two parts. One part is quickly frozen with liquid nitrogen for the PCR studies. The other part is spread flat and fixed in 10% neutral buffered formalin for 48 hrs. The fixed samples are resectioned, dehydrated in graded ethanol, cleared in xylene and paraffin embedded by standard technique. The paraffin blocks are cut into 5 μm sections with a rotary microtome, deparafinized with xylene, redydrated with draded ethanol and stained with hematoxylin and eosin for histopathological studies. The slides are placed in the Tris-buffered saline for 15 minutes (TBS, pH 9) and then to block endogenous peroxidase activity treated with $H_2O_2$ for 10 minutes. The slides are then rinsed with TBS and incubated with polyclonal guinea pig anti insulin (Dako, Denmark) for 60 minutes at room temperature. After washing the slides with the TBS solution are immunostained using Dako En Vision System. The slides are then rinsed with the TBS and treated with 3'-diaminobenzidine chromogen solution for 10 min at room temperature. The slides are then counter stained with hematoxylin, for 30 minutes rinsed in tap water, dehydrated, placed in xylene, mounted and photographed.

Figure 6A:
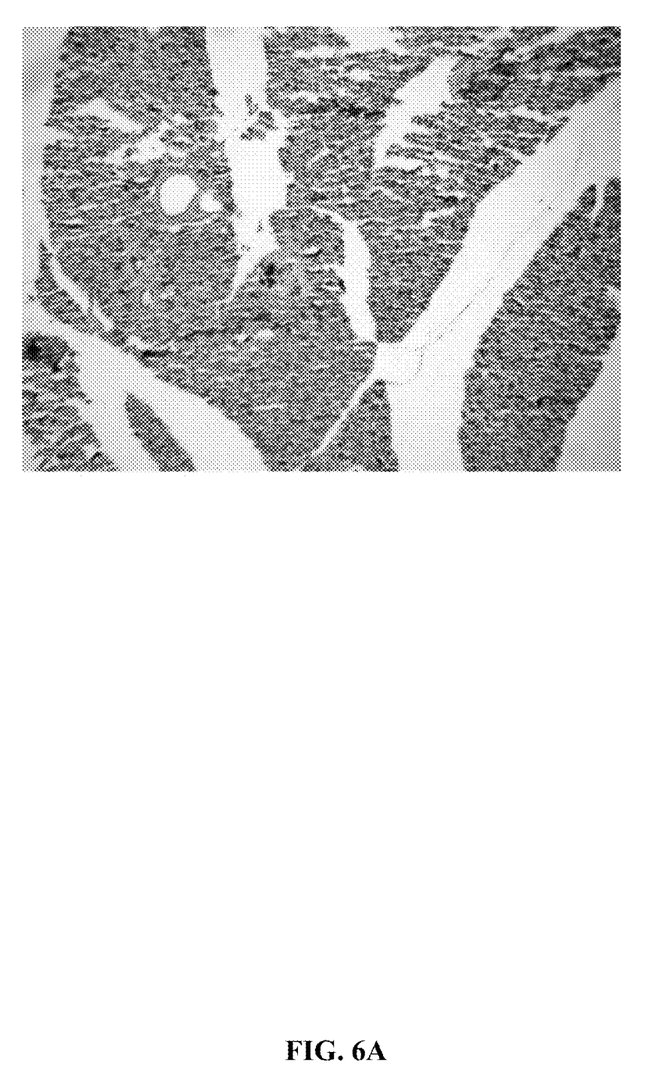
FIG. 6A illustrates the light microscope photograph of pancreatic islet of untreated diabetic rat, according to an embodiment herein.

FIG. 6A illustrates the light microscope photograph of pancreatic islet of untreated diabetic rat, according to an embodiment herein. The photograph shows the pancreatic islet of untreated diabetic rat of 21 days following the induction of diabetes.

Figure 6B:
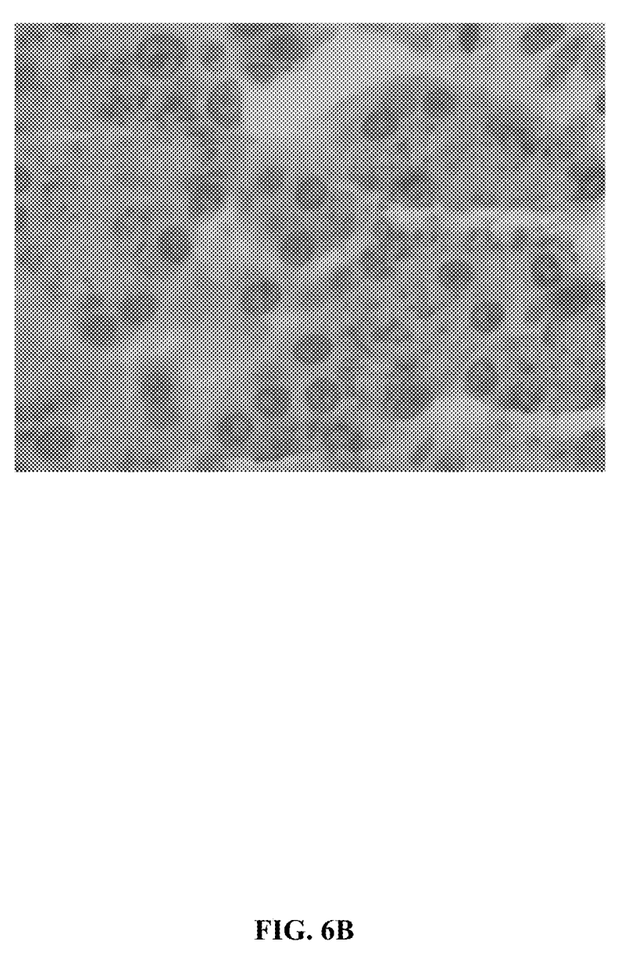
FIG. 6B illustrates is the light microscope photograph of pancreatic islet of diabetic rat, according to an embodiment herein.

FIG. 6B illustrates the light microscope photograph of pancreatic islet of diabetic rat, according to an embodiment herein. The photograph shows the pancreatic islet of diabetic rat 2 days post disease.

Figure 6C:
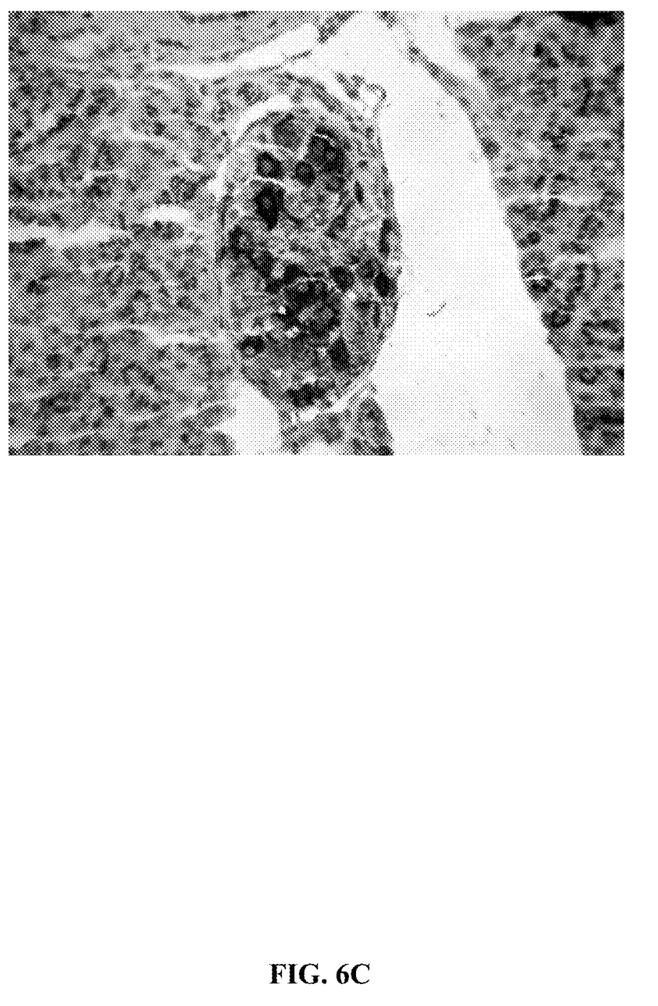
FIG. 6C illustrates the light microscope photograph of pancreatic islet of diabetic rat after treatment, according to an embodiment herein.

FIG. 6C illustrates the light microscope photograph of pancreatic islet of diabetic rat after treatment, according to an embodiment herein. The photograph shows the pancreatic islets of diabetic rat 21 days after treatment with the oligosaccharide.

Figure 6D:
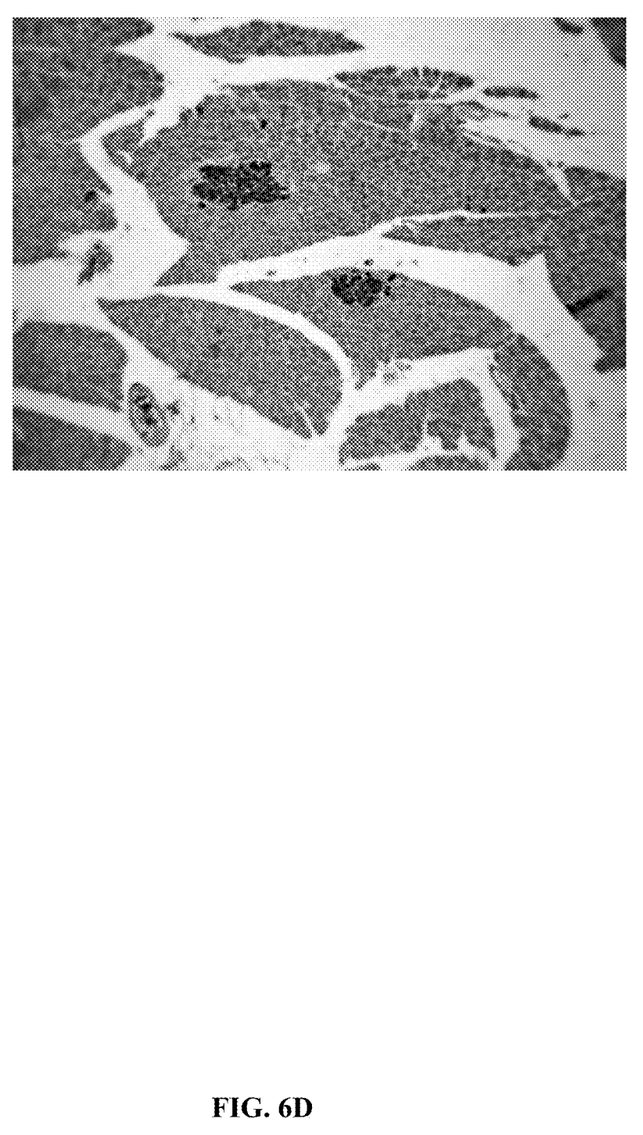
FIG. 6D illustrates the light microscope photographs of pancreatic islet of treated diabetic rat, according to an embodiment herein.

FIG. 6D illustrates the light microscope photographs of pancreatic islet of treated diabetic rat, according to an embodiment herein. The photograph shows the pancreatic islets of oligosaccharide treated rat 3 months following withdrawal of treatment.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for isolating and purifying a oligosaccharide molecule for the treatment of diabetes, the method comprises:
   collecting a plurality of ripe fruits of *Rosa arvensis*;
   identifying and authenticating the plurality of fruits and plant species;
   drying the collected ripe fruits in hot air circulation;
   powdering the dried fruits;
   adding de-ionized water to the powdered dried fruits to get an extract;
   filtering the extract;
   removing an unwanted materials from the extract by subjecting the filterate to a column of silica gel, and wherein the silica gel is G 60;
   collecting an eluent from the silica gel column;
   partitioning the eluent for two times against a triple volume of ethanol to obtain an eluent-ethanol mixture;
   filtering the eluent-ethanol mixture;
   fractioning the eluent-ethanol mixture in a silica gel flash column with ethanol-water mixture for conditioning;
   passing a first fractionate over a column filled with sephadex LH 20 using flash column chromatography;
   purifying the first fractionate again on a silica gel column filed with RP-18 for isolating oligosaccharide;
   collecting the isolated oligosaccharide for analysis;
   structurally analyzing the oligosaccharide by high performance liquid chromatography diode array detector tandem mass spectrometry (HPLC-DAD MS/MS), infra red radiation (IR) and nuclear magnetic resonance (NMR) systems;

wherein the oligosaccharide has a chemical structure represented by (1)

2. A method for isolating and purifying a oligosaccharide molecule for the treatment of diabetes, the method comprises:
   collecting a plurality of ripe fruits of *Rosa arvensis*;
   identifying and authenticating the plurality of fruits and plant species;
   drying the collected ripe fruits in hot air circulation;
   powdering the dried fruits;
   adding de-ionized water to the powdered dried fruits to get an extract;
   filtering the extract;
   removing an unwanted materials from the extract by subjecting the filterate to a column of silica gel, and wherein the silica gel is G 60;
   collecting an eluent from the silica gel column;
   partitioning the eluent for two times against a triple volume of ethanol to obtain an eluent-ethanol mixture;
   filtering the eluent-ethanol mixture;
   fractioning the eluent-ethanol mixture in a silica gel flash column with ethanol-water mixture for conditioning;

passing a first fractionate over a column filled with sephadex LH 20 using flash column chromatography;

purifying the first fractionate again on a silica gel column filed with RP-18 for isolating oligosaccharide;

collecting the isolated oligosaccharide for analysis;

structurally analyzing the oligosaccharide by high performance liquid chromatography diode array detector tandem mass spectrometry (HPLC-DAD MS/MS), infra red radiation (IR) and nuclear magnetic resonance (NMR) systems; wherein the oligosaccharide is a pectin with a low molecular weight, and wherein a structure of oligosaccharide comprises a plurality of galacturan units and an arabinan moiety, and wherein a first unit in the plurality of galacturan units is simple galacturonic acid with m/z 176, and wherein the first unit is linked by 1-4 linkage to a second unit, and wherein the second unit is a galacturonic acid with acetyl (O-methyl ester (CH3-COO, acetyl) at a position of 2 or 3 (carbon 2 or 3) and methoxycarbonyl (CH3 instead of H) at a position of 5 (carbon 5), and wherein remaining units in the plurality of galacturan units are methoxy carbonyl galacturonic acid, having 1-4 linkage.

3. The method according to claim 1, wherein the oligosaccharide has effect in blood glucose levels and pancreatic tissue/cell regeneration in a concentration of 8-40 mg/kg.

4. The method according to claim 1, wherein the oligosaccharide has effect in blood glucose levels and pancreatic tissue/cell regeneration in a period of at least 21 days.

* * * * *

SEQUENCE LISTING

<160> NUMBER OF SEQ ID NOS: 4

<210> SEQ ID NO 1
<211> LENGTH: 20
<212> TYPE: DNA
<213> ORGANISM: Artificial Sequence
<220> FEATURE:
<223> OTHER INFORMATION: Primer

```
<400> SEQUENCE: 1
ggtgccagag ttcagtgcta                                              20

<210> SEQ ID NO 2
<211> LENGTH: 20
<212> TYPE: DNA
<213> ORGANISM: Artificial Sequence
<220> FEATURE:
<223> OTHER INFORMATION: Primer

<400> SEQUENCE: 2
ttattctcct ccggttctgc                                              20

<210> SEQ ID NO 3
<211> LENGTH: 20
<212> TYPE: DNA
<213> ORGANISM: Artificial Sequence
<220> FEATURE:
<223> OTHER INFORMATION: Primer

<400> SEQUENCE: 3
acacagctct acaaggaccc                                              20

<210> SEQ ID NO 4
<211> LENGTH: 20
<212> TYPE: DNA
<213> ORGANISM: Artificial Sequence
<220> FEATURE:
<223> OTHER INFORMATION: Primer

<400> SEQUENCE: 4
cacttcgtat ggggagatgt                                              20
```